(12) United States Patent
LaMacchia et al.

(10) Patent No.: US 6,981,281 B1
(45) Date of Patent: Dec. 27, 2005

(54) FILTERING A PERMISSION SET USING PERMISSION REQUESTS ASSOCIATED WITH A CODE ASSEMBLY

(75) Inventors: Brian A. LaMacchia, Seattle, WA (US); Loren M. Kohnfelder, Bellevue, WA (US); Gregory Darrell Fee, Kirkland, WA (US); Michael J. Toutonghi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1002 days.

(21) Appl. No.: 09/599,015

(22) Filed: Jun. 21, 2000

(51) Int. Cl.$^7$ .............................. H04L 9/00; H04L 9/32; G06F 12/14; G06F 11/30
(52) U.S. Cl. ........................................ 726/27; 713/190
(58) Field of Search ............................... 713/200, 190; 726/27

(56) References Cited

U.S. PATENT DOCUMENTS

| | | | | |
|---|---|---|---|---|
| 5,915,085 A | 6/1999 | Koved | ......................... | 395/186 |
| 5,958,050 A | 9/1999 | Griffin et al. | ................ | 713/200 |
| 5,978,484 A | 11/1999 | Apperson et al. | ............. | 380/25 |
| 6,044,466 A | 3/2000 | Anand et al. | ................ | 713/200 |
| 6,044,467 A | 3/2000 | Gong | .......................... | 713/200 |

OTHER PUBLICATIONS

Scott Oaks, Java Security, May 1998, O'Reilly & Associates, Inc, pp. 62-123.*

"Decentralized Trust Management", by M. Blaze, J. Feigenbaum, J. Lacy, in Proceedings of the 1996 IEEE Symposium on Security and Privacy, pp. 164-173. Also available as a DIMACS Technical Report. This paper describes PolicyMaker. Available in Postscript at http://www.research.att.com/~jf/pubs/oakland96proc.ps.

(Continued)

*Primary Examiner*—Gilberto Barrón, Jr.
*Assistant Examiner*—Benjamin E. Lanier
(74) *Attorney, Agent, or Firm*—Lee & Hayes, PLLC

(57) ABSTRACT

A security policy manager generates a permission grant set for a code assembly received from a resource location. The policy manager can execute in a computer system (e.g., a Web client) in combination with the verification module and class loader of the run-time environment. The permission grant set generated for a code assembly is applied in the run-time call stack to help the system determine whether a given system operation by the code assembly is authorized. A permission request set may also be received in association with the code assembly. The permission request set may include a minimum request set, specifying permissions required by the code assembly to run properly. The permission request set may also include an optional request set, specifying permissions requested by the code assembly to provide an alternative level of functionality. In addition, the permission request set may include a refuse request set, specifying permissions that are not to be granted to the code assembly. The permission requests are used to filter a permission set to generate a permission grant set.

23 Claims, 8 Drawing Sheets

OTHER PUBLICATIONS

"Proceedings of the Sixth International World Wide Web Conference", Santa Clara, CA, Apr. 1997, by Y. Chu, J. Feigenbaum, B. LaMacchia, P. Resnick, M. Strauss, REFEREE: Trust Management for Web Applications. Available from http://www.farcaster.com/papers/www6-referee/index.htm.

"The Role of Trust Management in Distributed System Security". M. Blaze. J. Feigenbaum, J. Ioannidis, A. Keromytis, Secure Internet Programming: Security Issues for Distributed and Mobile Objects, Lecutre Notes in Computer Science, vol. 1603, Springer, Berlin, 1999, pp. 185-210. Postscript available from http://www.research.att.com/~jf/pubs/sip99.ps.

"Managing Trust in an Information-Labeling System", European Transactions on Telecommunications, 8 (1997), pp. 491-501. (Special issue of selected papers from the 1996 Amalfi Conference on Secure Communication in Networks.) Postscript from http://www.research.att.com/~jf/pubs/ett97.ps.

"The Evolution of Java Security", by Koved, Nadalin, Neal and Lawson, including information on Java-based systems, IBM.

Information on KeyNote including "The KeyNote Trust-Management System" from RFC 2704, at http://www.cis.upenn.edu/~angelos/keynote.html; and "Using the KeyNote Trust Management System" by Matt Blaze, at http://www.crypto.com/trustmgt/.

"Trust management on the World Wide Web", by Khare and Rifkin, at http://www7.scu.edu.au/programme/posters/1902/com1902.htm.

"Compliance Checking in the PolicyMaker Trust Management System", by Blaze, Feigenbaum and Strauss, AT&T Labs-Research.

International Search Report for PCT/US01/16057.

International Search Report for PCT/US01/16127.

Anand, R. et al., "A Flexible Security Model for Using Internet Content," Proceedings of the 16th Symposium on Reliable Distributed Systems. SRDS '97, Durham, NC, Oct. 22-24, 1997 & Proceedings of the Symposium on Reliable Distributed Systems, Los Alamitos,CA: IEEE Computer Soc, US, Oct. 22, 1997.

"Logically Extensible Privilege Control Set," IBM Technical Disclosure Bulletin, IBM Corp., New York, NY, vol. 34, No. 7B, Dec. 1, 1991.

* cited by examiner

FILTERING A PERMISSION SET USING PERMISSION REQUESTS ASSOCIATED WITH A CODE ASSEMBLY

CROSS-REFERENCE TO RELATED APPLICATIONS

The present application is related to U.S. patent application Ser. No. 09/598,534, entitled EVIDENCE-BASED SECURITY POLICY MANAGER, and U.S. patent application Ser. No. 09/598,814, entitled EVALUATING INITIALLY UNTRUSTED EVIDENCE IN AN EVIDENCE-BASED SECURITY POLICY MANAGER, filed concurrently herewith and assigned to the Assignee of the present invention.

TECHNICAL FIELD

The invention relates generally to computer security, and more particularly to filtering permission sets using a permission request associated with a code assembly.

BACKGROUND OF THE INVENTION

Security risks, such as allowing unauthorized access to a user's system, are inherent with many on-line activities. Therefore, security mechanisms have been developed to protect users' systems. For example, a user may download an on-demand application from the Internet and execute the application from within the browser. To prevent unauthorized access to the user's system resources (e.g., a directory on the user's hard disk), the user's system is protected by "sandbox" security that is enforced within the browser environment. Sandbox security involves a limited, secure area of computer memory in which an application may execute, so that the application is prevented from accessing system resources that reside outside of the secure area.

In some circumstances, however, a user may wish to allow a downloaded application controlled access to certain resources within the user's system. For example, a user may wish to use an on-demand word processing application to generate a document and then save the document to a directory in the user's system.

Existing approaches for providing such applications with secure, controlled access to a user's system are too cumbersome and inflexible. In one method, for example, a security policy is defined within a policy database in which a given application is associated with a permission set. The security policy, in combination with origin information, signature information, and access restrictions, helps define a "trusted" relationship between the application and the user's system.

Consider the following example:

```
grant codeBase "http://www.BobsWidgets.com" signed by BobsCertificate {
    permission lang.io.FilePermission "/tmp/" "read";
    permission lang.io.FilePermission "/tmp/bwdir/*" "write";
}
```

In the example, an applet from the source location, "www.BobsWidgets.com", is granted certain file access permissions if it is signed with a key corresponding to another key contained in BobsCertificate. An applet traditionally is a program designed to be executed from within a browser, rather than directly from within the operating system. The applet is granted permission to read files from the "/tmp" directory on the host system and to create and write to files in the "/tmp/bwdir" directory. Permission to "execute" is another common permission modifier. Other security policy specifications may, for example, grant broad permissions to access files in any system location, regardless of the application's source or whether the application is unsigned or signed.

In such approaches, security policies are particularly static, remaining fixed over long periods of time. As on-demand application processing via the Internet becomes more prevalent, substantially static security policies are too limiting. Furthermore, the infrequent security policy changes that do occur (usually performed by a system administrator) can introduce security weaknesses or gaps, or prevent authorized applications from running by denying access to an application that had previously been granted access. As such, existing security architectures fail to dynamically and flexibly determine whether an application (or a given code assembly of an application) may be trusted with some amount of access to the user's system.

Furthermore, in existing security frameworks, allocation of permissions is determined by the security policy defined in the user's system, and possibly by a query to the user during execution or loading of the application. As such, a component of an on-demand application does not generally influence which permissions are allocated in accordance with a security policy. For example, a component from an authorized location may be granted extensive access to protected areas of a computer system, even though that component may not require or even desire such access. For liability reasons, the component may desire more limited access. In addition, a component may not be able to execute without a minimum set of permissions. In existing security frameworks, an inadequate permission grant set is detected only when a requested operation fails for lack of permission during execution of the code assembly, at which point execution time has been wasted and error recovery may be more complex.

SUMMARY OF THE INVENTION

In accordance with the present invention, the above and other problems are solved by an evidence-based policy manager that generates a permission grant set for a code assembly received from a resource location. The permission grant set may be influenced (e.g., filtered) by permission requests received in association with the code assembly. The permission requests may define characteristics of the code assembly's permission needs. For example, the permission requests may include a minimum request set, specifying permissions required by the code assembly to run properly with at least a basic functionality. The permission requests may also include an optional request set, specifying permissions requested by the code assembly to provide an alternative level of functionality. In addition, the permission requests may include a refuse request set, specifying permissions that are not to be granted to the code assembly.

In an implementation of the present invention, a method for processing a permission set associated with a code assembly received from a resource location is provided to control execution of the code assembly. The permission set includes at least one permission associated with the code assembly. A permission request set is received in association with the code assembly. The permission set is filtered based on the permission request set to control execution of the code assembly.

In another implementation of the present invention, the method further comprises generating the permission set based on the membership of the code assembly in one or more code groups. A code group collection is defined based on a security policy specification. The code group collection includes one or more code groups. Evidence is received in association with the code assembly. The membership of the code assembly in the one or more code groups is evaluated based on the evidence.

In yet another implementation of the present invention, a policy manager module for processing a permission set associated with a code assembly received from a resource location to control execution of the code assembly is provided, including a filter that receives the permission set and a permission request set associated with the code assembly. The filter also filters the permission set based on the permission request set to control execution of the code assembly.

In other implementations of the present invention, articles of manufacture are provided as computer program products. One embodiment of a computer program product provides a computer program storage medium readable by a computer system and encoding a computer program for executing a computer process for processing a permission set associated with a code assembly received from a resource location to control execution of the code assembly. Another embodiment of a computer program product may be provided in computer data signal embodied in a carrier wave by a computing system and encoding the computer program for processing a permission set associated with a code assembly received from a resource location to control execution of the code assembly.

In one embodiment, the computer program product encodes a computer program for executing on a computer system a computer process defining a code group collection based on a security policy specification. The code group collection includes one or more code groups. Evidence is received in association with the code assembly. Membership of the code assembly in the one or more code groups is evaluated based on the evidence. The permission set is generated based on the membership of the code assembly in the one or more code groups. The permission set includes at least one permission associated with the code assembly. A logical set operation is performed on the permission set and the permission request set to generate a permission grant set.

A great utility of an embodiment of the present invention is filtering the permissions granted to a code assembly by the policy manager in accordance with permission requests. In this manner, the code assembly influences the permissions it receives, in cooperation with what the applicable security policy allows. The permissions are used to control execution of the code assembly within a computer system. It is advantageous to grant only those permissions actually requested by the code assembly. For example, a security policy may grant a trusted code assembly broad permissions. However, if the code assembly does not request a given permission, inadvertent access to a protected area of the computer system, such as caused by an error in the code assembly, can be avoided. Furthermore, the code assembly can refuse a given set of permissions to avoid exposure to potential liability for accessing (and possibly corrupting) a protected area of the computer system.

These and various other features as well as other advantages, which characterize the present invention, will be apparent from a reading of the following detailed description and a review of the associated drawings.

DETAILED DESCRIPTION OF THE INVENTION

An embodiment of the present invention provides an evidence-based policy manager that generates a permission grant set for a code assembly received from a resource location. Generally, a code assembly is a unit of packaged code, such as a .EXE file or a .DLL file. The policy manager can execute in a computer system (e.g., a Web client or a networked workstation) in combination with the verification module and class loader of the run-time environment; however, a policy manager can also execute outside of a run-time environment. The permission grant set generated for a code assembly is applied in a run-time call stack to help the system determine whether a given system operation by the code assembly is authorized. The policy manager may process permission requests received in association with the code assembly. Furthermore, both code assemblies and evidence may be received via a distribution mechanism, including a local source (e.g., from within the local machine), a local network or peripheral, or a remote resource location via a network (e.g., the Internet).

In an embodiment of the present invention, the permission requests are used to filter permissions initially offered by the policy manager based on a security policy specification and evidence received in association with the code assembly. In this manner, the code assembly can influence the resulting permission grant set that is associated with the code assembly, so as to avoid receiving excessive or unneeded permissions.

Figure 1:
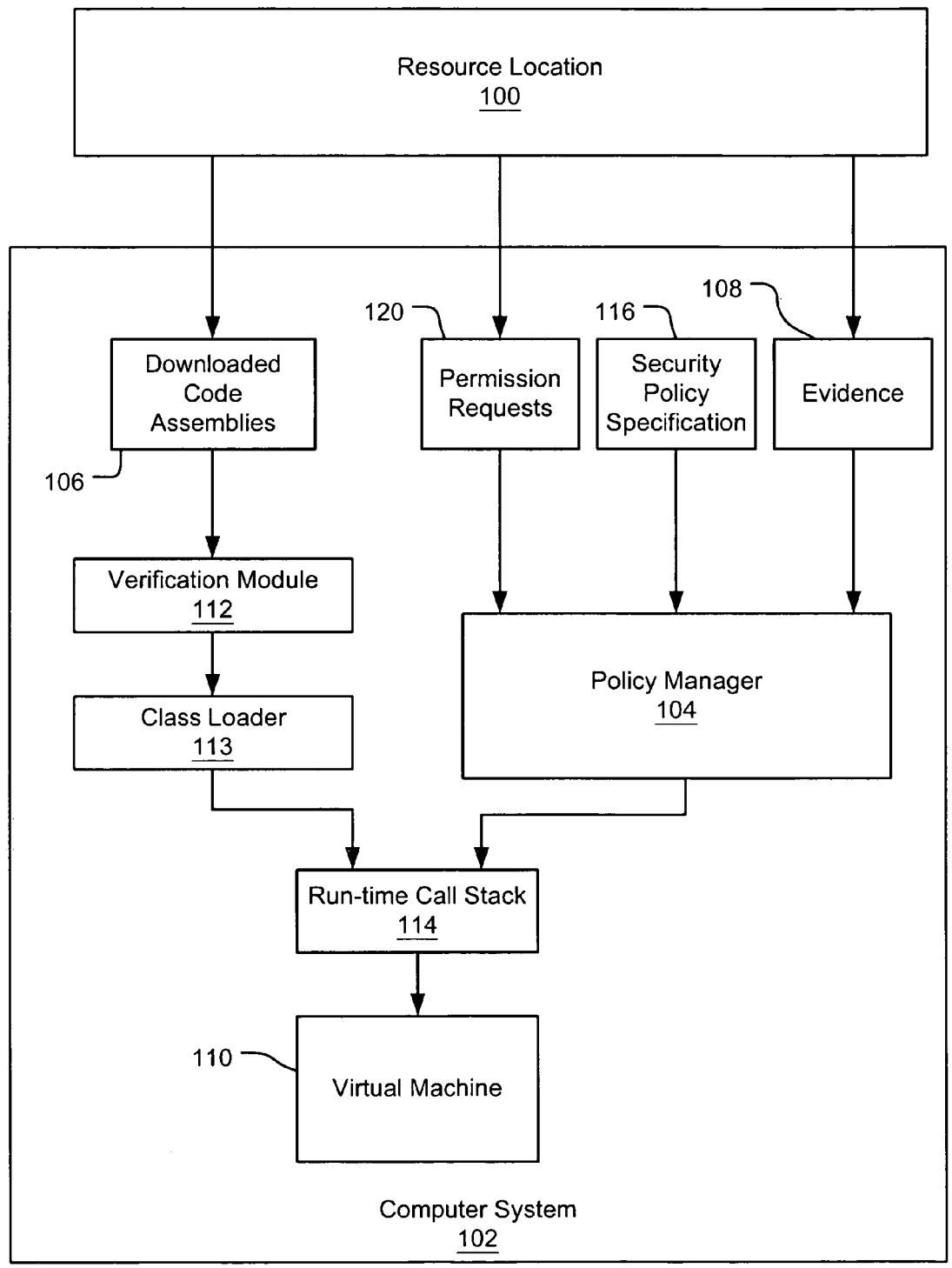
FIG. 1 depicts an evidence-based security policy manager in an embodiment of the present invention.

FIG. 1 depicts an evidence-based security policy manager 104 in an embodiment of the present invention. A resource location 100, such as a server, is accessible by a computer system 102 (e.g., a Web client or server) across a network (not shown). A resource location is commonly indicated by a URI (Uniform Resource Identifier), which is a generic term for all types of names and addresses that refer to objects on the World Wide Web. A URL (Uniform Resource Locator) is a kind of URI. Exemplary resources may include without limitation documents, images, audio data, applications, routines, and other data and code datastores accessible through a network. It should be understood that resource location may be local to the computer system 102 or remote to the computer system 102 (e.g., coupled by the Internet).

One type of resource relevant to an embodiment of the present invention is a code assembly. A code assembly may, for example, consist of applet code, application code, class code, routine code, and data. Code and data included in a code assembly may be in the form of byte-codes, intermediate code, machine code, and data components (classes, images, audio and video clips, etc.). Furthermore, a code assembly may be packaged in an archive file containing one or more classes downloaded from a resource location. In one embodiment of the present invention, classes of an application are combined into a module (an output of a linking process), and one or more modules may be combined into a code assembly.

FIG. 1 is described relative to a downloaded application executing on a computer system 102. Alternative embodiments may include downloaded applets, ACTIVEX controls, and other routines and objects. An exemplary downloaded application consists of objects defined in one or more local or remote code assemblies. Local code assemblies are stored within the computer system 102 and are loaded into memory when needed. Remote code assemblies are downloaded from a resource location, such as resource location 100.

The computer system 102 initiates a run-time environment to execute the downloaded application and to manage security of the system 102. The run-time environment on the computer system 102 may be initialized by a "trusted host", such as an operating system shell, a browser, an SQL server, or other code that is external to the run-time environment. The host also initiates execution of the application by downloading the various code assemblies 106 that constitute the application to the system 102 and passing the code assemblies 106 to a virtual machine 110 for execution.

A virtual machine provides a self-contained operating environment that performs much of the functionality of a separate computer. For example, an application can run in a virtual machine without direct access to the host operating system. This design has at least two advantages:

System Independence: An application will run the same in any virtual machine that supports the programming language in which the application is written, regardless of the hardware and software underlying the system. For example, the same application (i.e., the same programming code) can run in a virtual machine on different computer systems having different types of microprocessors and different types of operating systems.

Security: Applications running in a virtual machine are generally prevented from accessing protected system resources (i.e., the operating system, the file system, protected regions of memory, a connected network or peripheral). It should be understood, however, that an embodiment of the present invention can evaluate evidence and a security policy to determine whether to permit an application to access protected system resources. If permission for a given operation is granted, the application is considered "trusted" for that operation. Permission requests received in association with a code assembly can be used to filter the resulting permission grant set that is used to determine which operations the code assembly can perform.

As the application components (e.g., downloaded code assemblies 106) are received by the system 102, a verification module 112 ensures that downloaded code in the code assemblies 106 is properly formatted and does not violate the safety restrictions of the code language or the virtual machine 110. Other verifications, such as verifying that pointer addressing is not present, that internal stacks cannot overflow or underflow, and that code instructions will have the correct typed parameters, may also be performed. The code assemblies are then passed to a class loader 113, which can ensure that the application does not replace system-level components within the run-time environment (e.g., the class loader can force host-provided code assemblies to be executed when requested, thereby superceding name conflicts with downloaded code assemblies). Thereafter, the class loader 113 loads the code assemblies 106 onto a run-time call stack 114 in response to requests from the virtual machine 110.

Figure 2:
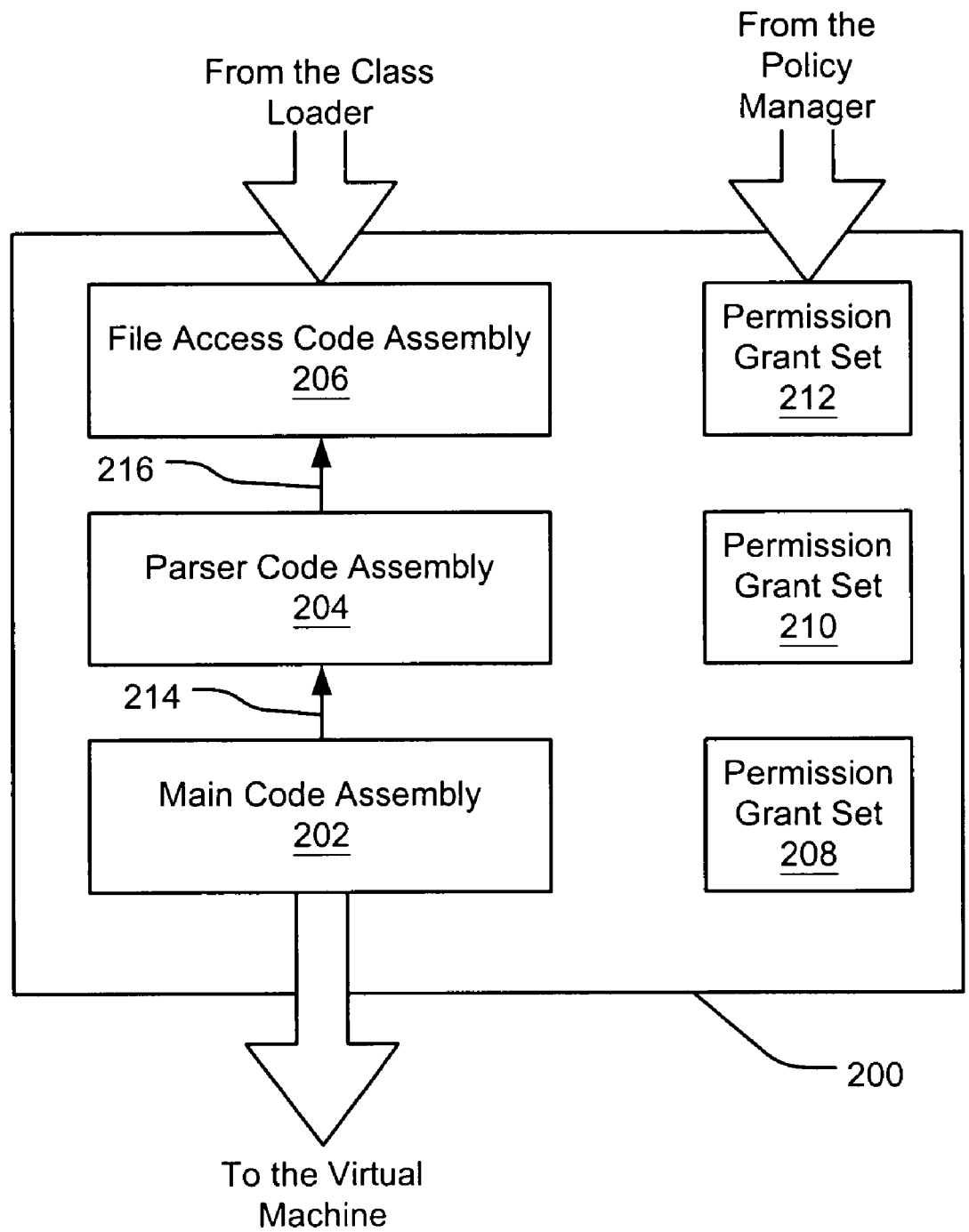
FIG. 2 represents a run-time call stack in an embodiment of the present invention.

For example, the virtual machine executes a first code assembly (e.g., main code assembly 202 of FIG. 2) that calls a routine provided by a second code assembly (e.g., parser code assembly of FIG. 2). The class loader 113 receives the virtual machine's request for the second code assembly and loads the second code assembly into the run-time call stack 114 so that the first code assembly can call the needed routine.

In order to ensure that unauthorized accesses to protected areas are prevented, evidence 108 associated with each of the downloaded code assemblies 106 is input to the policy manager 104. The policy manager 104 determines the permission grant set (see permission grant set 414 of FIG. 4) associated with each code assembly. A security policy specification 116 is also input to the policy manager 104 to assist in the computation of appropriate grants. In addition, permission requests 120 are received in association with the downloaded code assemblies 106 to specify characteristics of the permission needs of each downloaded code assembly 106. In one embodiment, the permission requests are recorded in a binary serialization format within the code assembly itself and, therefore, are downloaded with the code assembly in a single network communication. Alternatively, the permission requests may be recorded elsewhere at a resource location accessible by the policy manager 104 in a separate network communication. Furthermore, although a binary serialization format is specified as an exemplary format for recording permission requests, alternative data formats (e.g., XML) are contemplated within the scope of the present invention.

In addition, one data format, such as XML, may be used by the developer to initially specify the permission requests. Thereafter, the XML-specified permission requests may be encoded into another data format, such as a binary serialization format, for embedding in the code assembly. Furthermore, some compilers allow a developer to specify permission requests using declarative security annotations in the source code of the code assembly. The compiler then can encode the annotations into permission requests embedded into the code assembly.

In an embodiment of the present invention, the permission requests 120 are "typed", so that each type of permission request may be applied to filter the permissions in a different way. Based on these inputs, the policy manager 104 computes the appropriate grants for each code assembly and passes the resulting permission grant sets to the run-time call stack 114.

As such, each code assembly in the run-time call stack 114 is associated with a corresponding permission grant set (e.g., permission grant sets 208, 210, and 212 in FIG. 2). A grant set is received from the policy manager and defines various permissions that have been computed for a corresponding code assembly. The permissions associated with each code assembly may vary widely based on the relative origin of the code assembly (e.g., local or remote), the specific origin of the code assembly (e.g., a specific URL), or other trust characteristics of the code assembly, all of which may be referred to as "evidence" 108. In an embodiment of the present invention, trust characteristics are used to determine a permission grant set for a given code assembly. Furthermore, a security policy specification 116 may define multiple policy levels within a security framework for a given enterprise, machine, user, application, etc. in which the trust characteristics of a given code assembly are evaluated.

FIG. 2 represents a run-time call stack 200 containing individual code assemblies that are stacked in the order in which they were called. The individual code assemblies may be downloaded from a remote resource location or may be retrieved locally from the computer system 102 of FIG. 1. The individual code assemblies are loaded into the run-time call stack 114 by the class loader 113 for access and execution by the virtual machine 110 in FIG. 1.

For example, an object of the main application class in code assembly 202 is loaded first by the class loader into the illustrated run-time call stack 200. As the virtual machine executes the main class, the main class creates a parser object from a code assembly 204 and calls a method in the parser object to parse a data file in a protected area of the computer system. Accordingly, the class loader loads the parser code of the code assembly 204 into the run-time call stack 200. Thereafter, the parser object creates a file access object from a code assembly 206 and calls a method in the file access object to perform a read operation on the protected file. Accordingly, the class loader loads the file access code of the code assembly 206 into the run-time call stack 200.

Each permission grant set corresponds to a code assembly in the run-time call stack. As such, a code assembly's attempt to access a protected resource is evaluated against its associated permission grant set, as well as the permission grant sets of other code assemblies in the run-time call stack 200. In the example of the read operation to the protected file by the application illustrated in FIG. 2, the main code assembly 202 is associated with a permission grant set 208. The main code assembly 202 calls (as represented by arrow 214) a method in the parser code assembly 204, which is associated with the permission grant set 210. In order to access the protected file, the parser code assembly 204 calls (as represented by arrow 216) a method in the file access code assembly 206, which is associated with the permission grant set 212. In order to determine whether the file access code assembly 206 can access the protected file, the "intersection" of the permission grant sets 208, 210, and 212 is calculated and used to determine whether the file access operation is permitted. For example, if the permission grant set 212 includes a permission to read from the protected file, but one of the permission grant sets 208 or 210 does not, then access to the protected file is denied.

Generally, an "intersection" operation (represented by the symbol "∩") is a set operation that yields the common elements of the operand sets. For example, if Set1 includes elements A, B, and C, and Set2 includes elements B, C, and D, then the intersection of Set1 and Set2 (i.e., Set1∩Set2) equals B and C. In contrast, a "union" operation (represented by the symbol "∪") is a set operation that yields all elements in the operand sets (i.e., the non-duplicative aggregation of all the elements in the sets). For example, if Set1 includes elements A, B, and C, and Set2 includes elements B, C, and D, then the union of Set1 and Set2 (i.e., Set1∪Set2) equals A, B, C and D.

Figure 3:
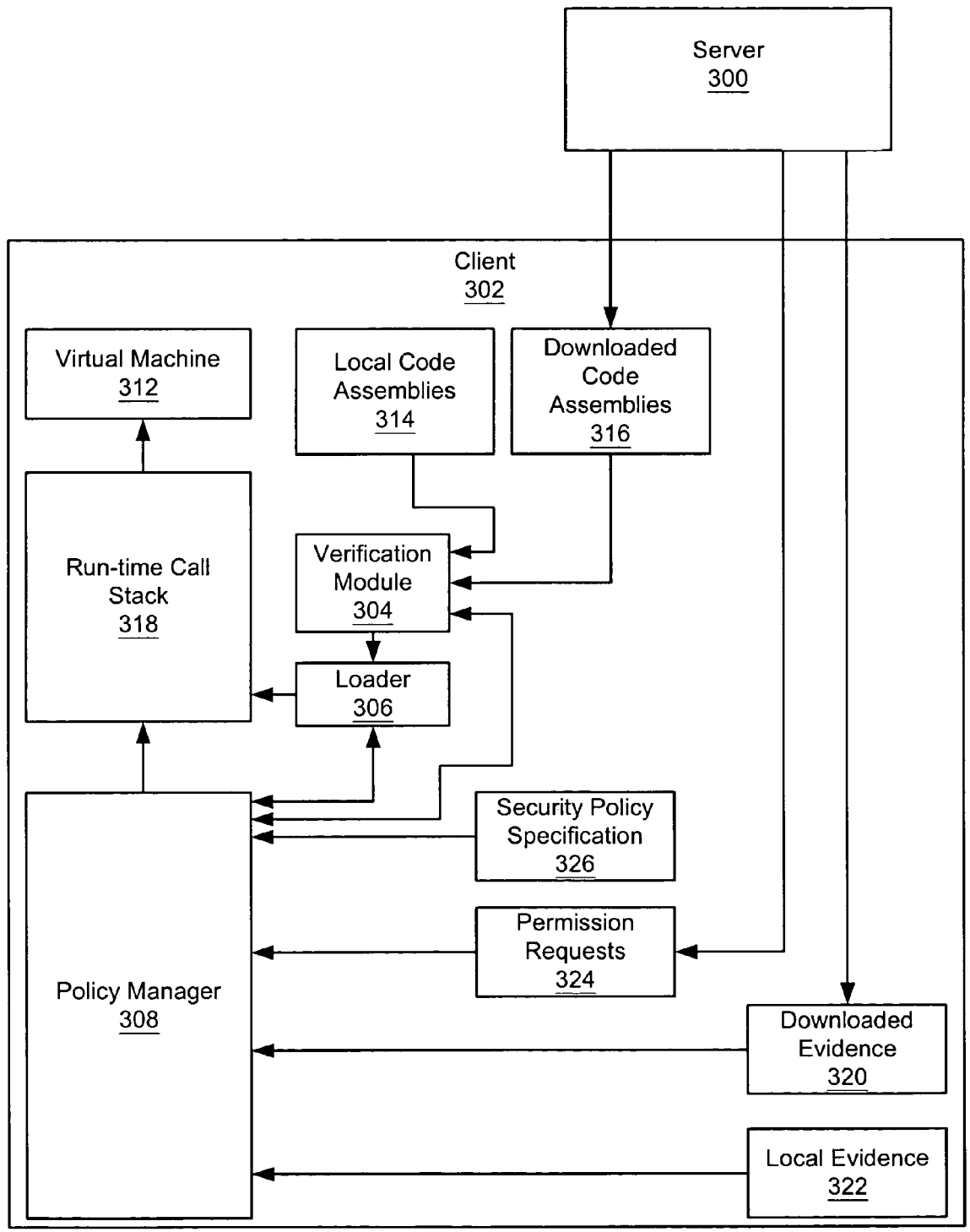
FIG. 3 depicts a computer system for managing evidence-based security in an embodiment of the present invention.

FIG. 3 depicts a computer system for managing evidence-based security in an embodiment of the present invention. A server 300 (e.g., a Web server) is coupled to a client 302 (e.g., a Web client) via a communications network (not shown). The client 302 executes a run-time environment (e.g., the COM+ 2.0 Run-time environment from Microsoft Corporation) to manage execution of applications on the client 302. In an embodiment of the present invention, the run-time environment includes verification module 304, a loader module 306, and a policy manager 308.

As previously discussed, code assemblies are loaded into a run-time call stack 318 for execution by a virtual machine 312. A first category of code assembly is represented by local code assemblies 314, which are generally considered trusted code assemblies because they originate on the client 302. In contrast, a second category of code assembly is represented by downloaded code assemblies 316, which may originate from a remote or untrusted resource location, such as the server 300. In an embodiment of the present invention, local code assemblies 314 and downloaded code assemblies 316 are input to the verification module 304 for verification. Thereafter, the code assemblies are input to the loader module 306 to be loaded into the run-time call stack 318.

The code assemblies 314 and 316 are generally associated with evidence (or credentials) used to compute a permission grant set for each code assembly. One exemplary evidence component may be an AUTHENTICODE signature. Another exemplary evidence component is a PICS (Platform for Internet Content Selection) label, which states properties of an Internet resource (e.g., executable code has been virus checked). More details regarding a PICS label are discussed in P. Resnick and J. Miller, "PICS: Internet Access Controls without Censorship," Communications of the ACM, 39 (1996), pp. 87–93; also available at www.w3.org/pub/WWW/PICS/iacwcv2.htm. Other examples of evidence may include, without limitation, proofs of purchase or license, author identifiers, vendor identifiers, versioning information, and programmatic credentials. Programmatic credentials may, for example, be in the form of program code that examines statements made by other credentials and fetches supplementary information from the network before deciding which evidentiary statements to provide to the policy manager 308.

Evidence about a code assembly may be provided by the host or extracted from the code assembly itself. Local or host-provided evidence 322 is implicitly trusted and believed to be true. However, downloaded or assembly provided evidence 320 is not implicitly trusted and must either be self-verifying (e.g., digitally-signed) or independently verified. Downloaded evidence 320 may be downloaded from one or more resource locations and is not limited to evidence downloaded from the resource location from which the code assembly originates.

Local evidence 322 and downloaded evidence 320 are input to the policy manager 308, which evaluates the evidence based on the security policy. Within the policy manager 308, the evidence is evaluated in combination with the security policy specification 326 (and optionally permission requests 324, which define a permission set requested by the code assembly) to generate a final permission grant set that corresponds with a given code assembly.

In an embodiment of the present invention, the permission requests 324 are associated with one or more code assemblies 314 and 316 and may include at least one of three types of permission request sets: (1) a minimum request set (MinRS); (2) an optional request set (OptRS); and (3) a refuse request set (RefuseRS). It should be understood that alternative types of permission request sets are contemplated within the scope of the present invention.

Figure 4:
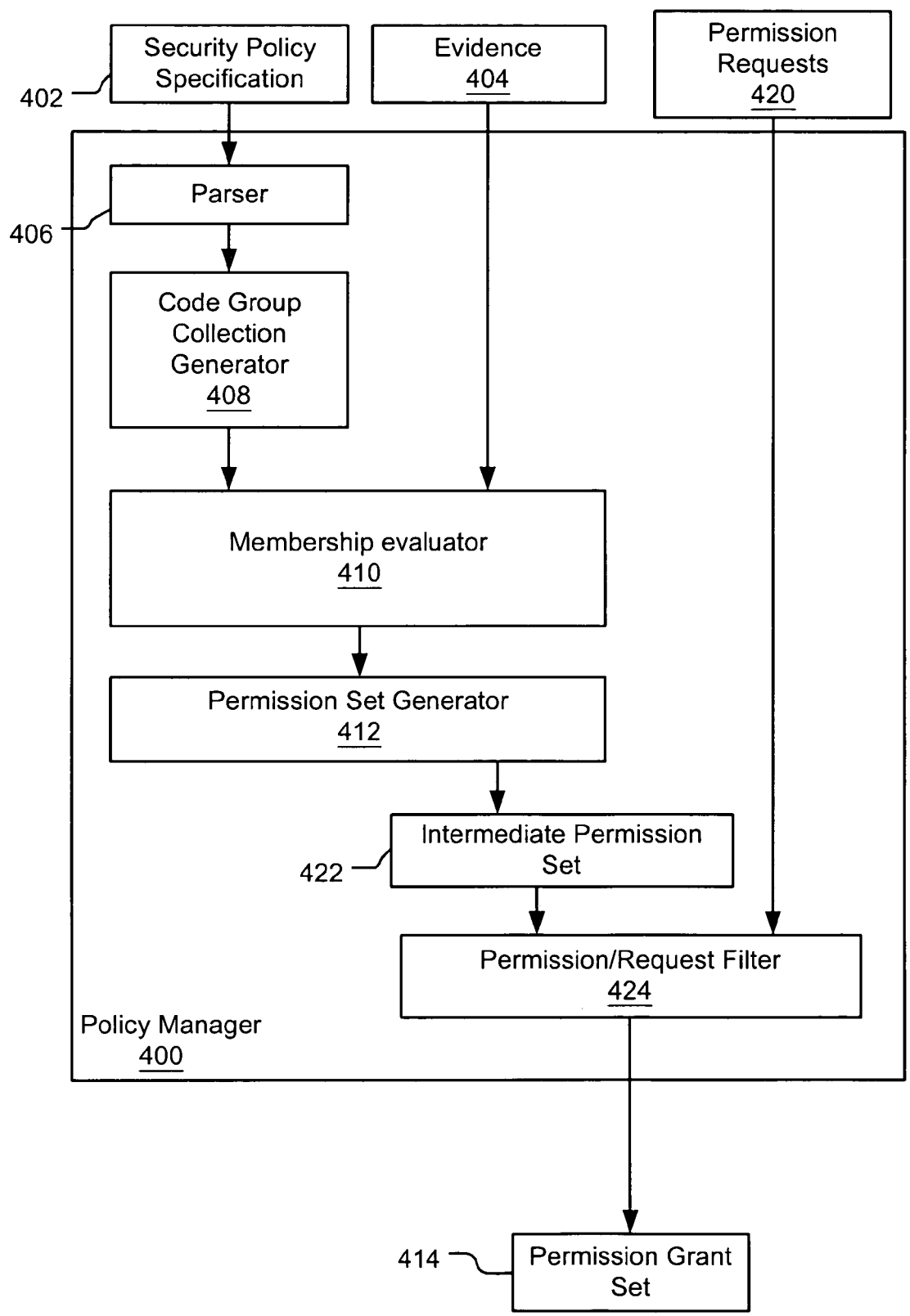
FIG. 4 depicts modules of a policy manager for managing evidence-based security in an embodiment of the present invention.

In one embodiment of the present invention (see the filtering flow diagram of FIG. 6), the default values for MinRS and RefuseRS equal the empty set and the default value for OptRS is the universal set. As a result, if no permission requests are provided, then the intermediate permission set 422 of FIG. 4 is granted as the resulting permission grant set 414.

The minimum request set defines a minimum permission condition and may include the minimum set of permissions that the associated code assembly requires in order to execute. If the permission grant set generated by the policy manager 308 does not satisfy the minimum permission condition (e.g., if the minimum request set is not a subset of the intermediate permission set output by the permission set generator 518 of FIG. 5), then the policy manager 308 raises a policy exception that signals the loader 306 that the associated code assembly 314 or 316 should not be loaded. In this embodiment, a security determination involving the minimum request set is evaluated prior to loading and execution of the code assembly. Alternatively, a policy manager 308 may allow the code assembly to be loaded with an inadequate permission grant set, although by virtue of the inadequate permission grant set, the code assembly will fail to execute.

Alternative minimum permission conditions may be employed within the scope of the present invention, including without limitation, providing multiple, ordered request sets, wherein the minimum permission condition is satisfied if at least one of the ordered request sets is a subset of the intermediate permission set. As such, the first ordered request set to be satisfied may be used to filter the intermediate permission set.

Furthermore, alternative techniques for preventing the code assembly from executing may also be employed, including without limitation setting attributes associated with the associated code assembly 314 or 316 indicating that the minimum permission condition has not been satisfied. The loader 306, for example, may check the attributes for each code assembly before proceeding with loading the code assembly. The loader 306 may also return a result to the virtual machine 312 indicating that the code assembly failed to load and cannot be executed.

In an alternative embodiment of the present invention, the run-time environment within the client 302 may attempt to provide corrective action in response to a failure of a code assembly to obtain permissions that satisfy the minimum request set. For example, if a minimum request set includes a required permission for writing to a given protected directory, the run-time environment may query the user to grant this permission. In addition, the authority required for a user to interactively grant such a required permission may be limited based on the identity of the user (e.g., only a user with administrator status may interactively grant such a permission).

The optional request set contains permissions that the code assembly would prefer to be granted, but are not absolutely required for the code assembly to execute. Such optional permissions may allow a code assembly to provide enhanced functionality. However, if the optional permissions are not granted, then a more basic functionality may still be available, as defined by the minimum request set.

One embodiment of the present invention handles the optional nature of the optional request set by incorporating the optional functionality into the code assembly. That is, if some or all of the permissions in the optional request set are not granted, the code assembly may discover this when a requested operation is denied (or when the requested optional permission is denied) during execution. In response to such a denial, the code assembly can execute alternative or additional code that relies on a different permission, such as a permission indicated in the minimum permission set. In this embodiment, a security determination involving the optional request set is evaluated during execution of the code assembly.

In an alternative embodiment, multiple optional request sets may be received by the policy manager 308. The multiple optional request sets may be processed so as to specify permissions requested corresponding to multiple levels of functionality. Based on the optional request sets that can or cannot be satisfied by the permission set, the policy manager 308 can signal the loader 306 to omit loading one or more classes. For example, it may not be necessary to load a given class if the loader 306 knows beforehand that the permissions required by the class are not available. Such optional request sets can also be ordered so that a highest level of permission grant can cause the loading of appropriate code assemblies to provide a highest level of functionality.

Alternatively, the optional request sets can be used to specify groups of optional permissions. For example, to provide a first level of functionality, a code assembly may require permissions A, B, C, and D (as specified by a first optional request set), whereas to provide a second level of functionality, the code assembly may require only permissions A and B (as specified by a second optional request set). As such, if the permission set can provide only permissions A, B and C, the first optional request set is not satisfied, but the second optional request set is satisfied. Accordingly, the second optional request set filters the permission set to provide only permissions A and B, avoiding an unnecessary grant of permission C.

Furthermore, because the verification process at the verification module 304 and the security management process at the policy manager 308 can execute concurrently, the two processes can communicate to affect each other. For example, the policy manager 308 may evaluate evidence indicating that a given code assembly is guaranteed to be type safe. Accordingly, this type safety guarantee can be communicated to the verification module 304, which may skip a type checking operation based on the information. Alternatively, the verification module 304 may determine that a given code assembly does not pass a type safety check. In response, the verification module 304 may communicate with the policy manager 308 to query whether the code assembly has been granted a permission to execute despite the failure to pass a type safety check.

FIG. 4 depicts modules of a policy manager for managing evidence-based security in an embodiment of the present invention. Executable modules described relative to FIG. 4 may be implemented as software modules that are executable on a computer system. Alternatively, executable modules implemented in hardware or in a combination of hardware and software are also contemplated in the scope of the present invention. In addition, modules disclosed herein may be merged into fewer modules or divided into additional modules without departing from the scope of the present invention.

A policy manager 400 is coupled to receive a security policy specification 402 and an evidence set 404. The security policy specification 402 specifies a definition of one or more code groups. In one embodiment, the code groups are configured into one or more code group collections. Alternatively, code groups may be configured into one or more code group hierarchies. The security policy specification may also define one or more policy levels. The evidence set 404 defines trust characteristics associated with a code assembly received by a computer system.

In an embodiment of the present invention, a parser module 406 receives the security policy specification 402 and extracts a definition of one or more named code groups. Each code group is associated with a membership criterion, a child definition (specifying zero or more child code groups of the code group), and a code-group permission set. The membership criterion specifies the conditions of membership for a given code group, which an evidence set must satisfy in order for a corresponding code assembly to be deemed a member of the code group. The child code group definition specifies the children of a given code group. If a code assembly proves membership in a first code group (i.e., a parent code group), the code assembly will be considered for membership in the child code groups of the parent code group. Code-group permission sets represent collections of permissions that may be assigned to code groups. If a code assembly is determined to be a member of the code group, the permissions of the associated permission set may be granted to the code assembly, subject to other operations within the policy manager.

Other code group embodiments may include alternative data configurations. For example, in one embodiment, a code group collection is represented in a one-dimensional list of code groups, wherein each code group includes a membership criterion and a permission set, and omits a child code group definition of the previous discussion. In this embodiment, the one-dimensional list may be ordered or unordered. Furthermore, other data configurations are contemplated within the scope of the present invention.

In an exemplary embodiment of the present invention, permission sets may be named to allow identification in the security policy specification 402. More than one code group may be assigned the same named permission set. As such, if a change is made to a named permission set (e.g., insertion or deletion of an individual permission), the change affects all of the code groups associated with that named permission set. For example, to grant the same permissions to several extranet business partner web sites that are members of different code groups, a single named permission set can be defined and assigned to the several code groups.

In an embodiment of the present invention, three types of named permission sets are supported: (1) standard permission sets—these sets are predefined and cannot be changed; (2) predefined permission sets—these sets may be modified by the administrator; and (3) custom permission sets—these sets may be defined by a user so long as the permission set names do not conflict standard or predefined permission set names. In one embodiment, standard permission sets are available at all policy levels and may not be redefined in any individual policy level (universal scope). In this embodiment, the predefined and custom permission sets are defined and referenced within any given policy level and cannot be referenced from other policy levels (policy-level scope). It should be understood, however, that the scope of any permission set may extend beyond a given policy level in an alternative embodiment of the present invention.

Table 1 describes standard permission sets available in an embodiment of the present invention. Some standard permission sets, such as Internet and LocalIntranet sets, are predefined but may be modified by a user or an administrator. Other permission sets, such as SkipVerification, cannot be modified in an embodiment of the present invention. Alternative named permission sets are also contemplated within the scope of the present invention, and the named permission sets described in Table 1 may be modified without departing from the present invention.

TABLE 1

Standard Permission Sets

| Standard Permission Sets | Description |
| --- | --- |
| Nothing | The associated code assembly has no permissions (i.e., to execute, to read, to write, to create, to append, to customize, to assert, to use, etc.). |
| Execution | The associated code assembly has permission to execute, but no other permissions to use protected resources. |
| Internet | The associated code assembly has the default permissions suitable for content from unknown origin, including permissions to execute, to open safe windows on the user interface to access the clipboard, to create its own application domain, to store a limited amount of data in a secure area, etc. |
| LocalIntranet | The associated code assembly has the default permissions suitable for content originating from within an enterprise, including permissions to access usernames and the temp directory, to read, append, write, and customize file dialogue boxes, to execute and assert, to broadly access the user interface, to store a limited amount of data in a secure area, etc. |
| Everything | The associated code assembly has permissions from all standard name permission sets. |
| Skip Verification | The verification process or a portion thereof may be skipped, or the code assembly has permission to fail verification or a portion thereof. |

Although many permissions have been discussed herein as exemplary permissions in an embodiment of the present invention, the list of possible permissions contemplated within the scope of the present invention are not limited to these exemplary permissions. For example, a permission may be granted to allow a code assembly to execute despite failing verification. Another permission may be granted to allow a class in a code assembly to inherit from a class in another code assembly (e.g., a right to subclass).

The code-group permission set associated with a given code group may specify permissions associated with the code group. Alternatively, the code-group permission set associated with a given code group may specify permissions associated with the code group and all ancestor code groups. This flexibility allows a variety of security configurations (e.g., policy levels, permission sets, membership criteria, etc.) to defined in a security policy specification. As discussed below, the policy manager may be developed to accommodate such a variety of security configurations.

In one embodiment, the security policy specification 402 may also specify multiple policy levels, each policy level having one or more code groups. The code groups may be configured into one or more code group collections. Policy levels allow an administrator, for example, to define different security policies for different machines, users, applications, time periods, user groups etc. When a membership evaluator module 410 generates a policy-level permission set for a given policy level, the membership evaluator module 410 traverses through the code groups associated with that policy level. The policy manager 400, therefore, can generate a permission set associated with the individual policy level. Thereafter, the permission sets from the multiple policy levels may be processed (e.g., merged or selected) to generate a resulting permission grant set 414.

In the illustrated embodiment, a code group collection generator module 408 receives the parsed definition from the parser module 406 and generates one or more code group collections in the memory of the computer system. The membership evaluator module 410 receives the evidence set 404 and extracts trust characteristics relating to the corresponding code assembly. The membership evaluator module 410 traverses through the code groups to determine whether the code assembly is a member of one or more of the code groups. A permission set generator module 412 receives the membership determination from the membership evaluator module 410 and generates a intermediate permission set 422, based on a logical combination of the code-group permission sets associated with code groups in which the code assembly is determined to be a member. A permission/request filter module 424 filters the intermediate permission set 422 and generates the resulting permission grant set 414.

Figure 5:
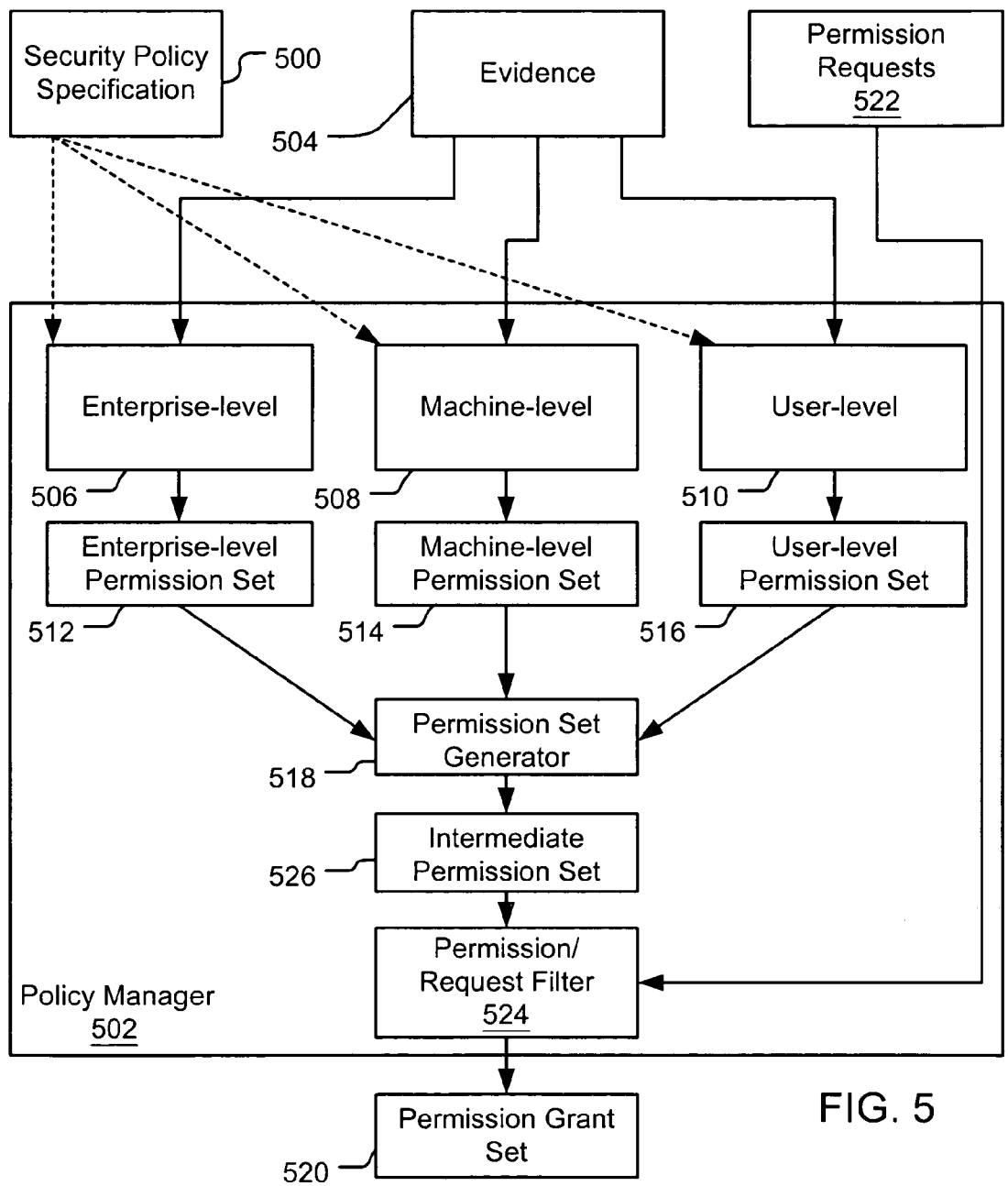
FIG. 5 depicts exemplary policy-levels on which a policy manager operates in an embodiment of the present invention.

FIG. 5 depicts exemplary policy-levels on which a policy manager operates in an embodiment of the present invention. A security policy specification 500 is processed on the policy manager 502 to generate one or more security policy levels 506, 508, and 510 (this processing is represented by the dotted lines pointing to each of the policy levels). In an embodiment of the present invention, the security policy specification 500 is written in an XML (eXtensible Markup Language) file. In alternative embodiments, however, other data formats may be employed, including without limitation SGML (Standard Generalized Markup Language), HTML (HyperText Markup Language), RDF (Resource Description Framework), Visual Basic, and other standard and customized data and code formats.

In an embodiment of the present invention, the security policy specification 500 is a persistent representation of a security policy (e.g., an ordered collection of policy levels and/or code group collections), wherein each policy level is constructed of code groups. Lower order policy levels generally specify more restrictive policy restrictions than those of higher order policy levels. The security policy specification 500 is typically generated by a system administrator, a user, or an application setup program having appropriate permissions. Exemplary policy levels may include without limitation enterprise, machine, user, and application policy levels.

In one embodiment of the present invention, the highest level policy level is an enterprise policy level, which may define the security policy applied to all systems within any given enterprise. A lower policy level is a machine policy level, which may define the security policy applied to all users on a given system. A user policy level may define the security policy applied to a given user, regardless of which individual system the user is logged in to. An application policy level may define a security policy applied to a given application, regardless of the user or system executing the application. Additional policy levels and policy level orders are contemplated within the scope of the present invention.

The security policy specification 500 also manages security using a code group collection (e.g., collection of code group levels), which are defined by membership conditions and contain permission sets and special attributes. The security policy specification 500 consists of declarations of code groups with associated sets of permissions. A code assembly that is a member of a given code group may be granted permissions from the permission set associated with the code group. Code group membership is determined by the policy manager 502 using evidence set 504 associated with the code assembly, such as a digital signature, the origin of the code assembly, etc. An administrator may add a code group to the code group collection in order to grant additional permissions to code assemblies belonging to the new code group.

In an embodiment of the present invention, a code group may be attributed with an "Exclusive" property flag, which specifies that only the permissions associated with this particular code group are to be applied to the member code assembly. Permission sets from other member code groups are ignored (i.e., not merged).

In an embodiment of the present inventions, code groups are defined in a code group collection having a root node corresponding to "all" code assemblies. The root node represents a parent code group having children nodes, each of which may also have children nodes, and so on, to form a code group hierarchy. Alternative code group collections are also contemplated within the scope of the present invention including without limitation ordered and unordered lists of code groups. If the policy manager 502 determines a code assembly is a member of a parent code group, then the code assembly is tested against the children of the parent code group to determine membership therein. Exemplary code group types and membership criteria are described in Table 2, although other code group types are contemplated within the scope of the present invention. Furthermore, code group types may be associated with a property. For example, a code group type "software publisher" may be associated with a specified publisher, "Microsoft", as in "Publisher: Microsoft".

TABLE 2

Exemplary Code Groups

| Code Group Types (label) | Membership Criterion Description |
|---|---|
| all code ("All Code") | All code assemblies are deemed members of this code group. |
| software publisher ("Publisher") | Code assemblies published by a specified publisher (e.g., Microsoft) and verified with a public key of a valid AUTHENTICODE signature are deemed members of this code group. |
| Zone ("Zone") | Code assemblies originating from a specified zone of origin (e.g., Internet, LocalIntranet, Restricted-Sites, etc.) are deemed members of this code group. |
| strong name ("Name") | Code assemblies having a specified cryptographically signed name space (e.g., MS.Windows) are deemed members of this code group. |
| web site ("Site") | Code assemblies originating from a specified web site (e.g., www.microsoft.com or *.microsoft.com, where "*" represents a wildcard character) are deemed members of this code group. |
| URL ("URL") | Code assemblies originating from a specified resource location that includes a final wildcard character "*" (e.g., http://www.microsoft.com/app/*) are deemed members of this code group. |

Furthermore, the security policy specification 500 may define multiple policy levels. In the illustrated embodiment, each policy level (e.g., enterprise-level 506, machine-level 508, and user-level 510) has an individual code group collection. As previously discussed, other policy level configurations may be employed within the scope of the present invention, such as one or more code group collections over which the multiple policy levels are allocated (e.g., one policy level per subtree associated with a child of a root node).

In the illustrated embodiment, a policy-level permission set (e.g., enterprise-level permission set 512, machine-level permission set 514, or user-level permission set 516) is generated from each of the policy levels. A policy-level permission set merger 518 merges or otherwise processes the policy-level permission sets 512, 514, and 516 to generate a intermediate permission set 526. The permission/request filter 524 inputs the permission requests 522 and applies a filter algorithm to the intermediate permission set 526 to generate the resulting permission grant set 520, if appropriate.

Figure 6:
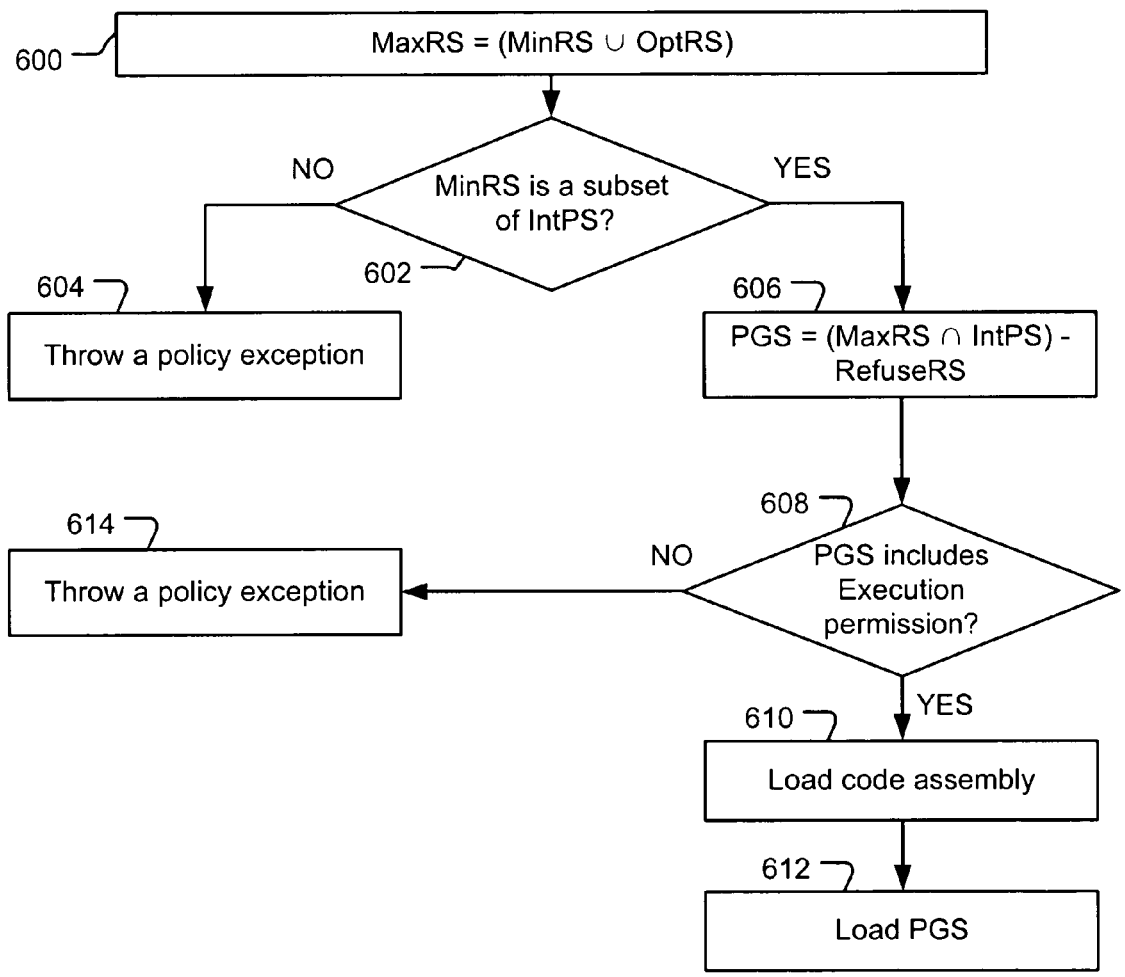
FIG. 6 illustrates a filtering flow diagram used in an embodiment of the present invention.

In an exemplary embodiment, the permission/request filter 524 applies a filter algorithm to generate the permission grant set 520, described in combination with FIG. 6:

1) MaxRS=(MinRS∪OptRS) [Operation 600]
2) If (MinRS is not a subset of IntPS) [Operation 602], then the policy manager 502 throws a policy exception to prevent loading and/or execution of the code assembly [Operation 604]
3) If (MinRS is a subset of IntPS) [Operation 602], then PGS=(MaxRS∩IntPS)−RefuseRS [Operation 606]
4) If (PGS includes the Execution permission) [Operation 608], then the code assembly may be loaded by the loader 306 of FIG. 3 [Operation 610] and PGS may be loaded into the run-time stack 318 in FIG. 3 in association with the code assembly [Operation 612]
5) If (PGS does not include the Execution permission) [Operation 608], then the policy manager 502 throws a policy exception to prevent loading and/or execution of the code assembly [Operation 614]

where PGS represents the permission grant set 520, IntPS represents the intermediate permission set 526, MaxRS represents the maximum request set, MinRS represents minimum permission requests, OptRS represents optional permission requests, and RefuseRS represents refuse permission requests. MinRS, OptRS, and RefuseRS are received as elements of the permission requests 522.

In an embodiment of the present invention, if MinRS, OptRS, or RefuseRS are not specified, they are assigned default values. For MinRS and RefuseRS, the default values are empty sets. For OptRS, the default value is the universal set. For example, if MinRS and OptRS are not specified, then PGS would equal IntPS−RefusePS.

Logical set operation 606 is used to generate a subset of the intermediate permission set, so that only the needed permissions are included in the permission grant set. That is, the intermediate permission set may be much broader than that required or requested by the code assembly. Accordingly, unnecessary or non-requested permissions are omitted from the resulting permission grant set.

It should be understood that the algorithm disclosed above is merely an exemplary algorithm for filtering a intermediate permission set using permission requests. Alternative algorithms are contemplated within the scope of the present invention, particularly if an alternative permission request combination is used (e.g., additional types of permission request sets).

Figure 7:
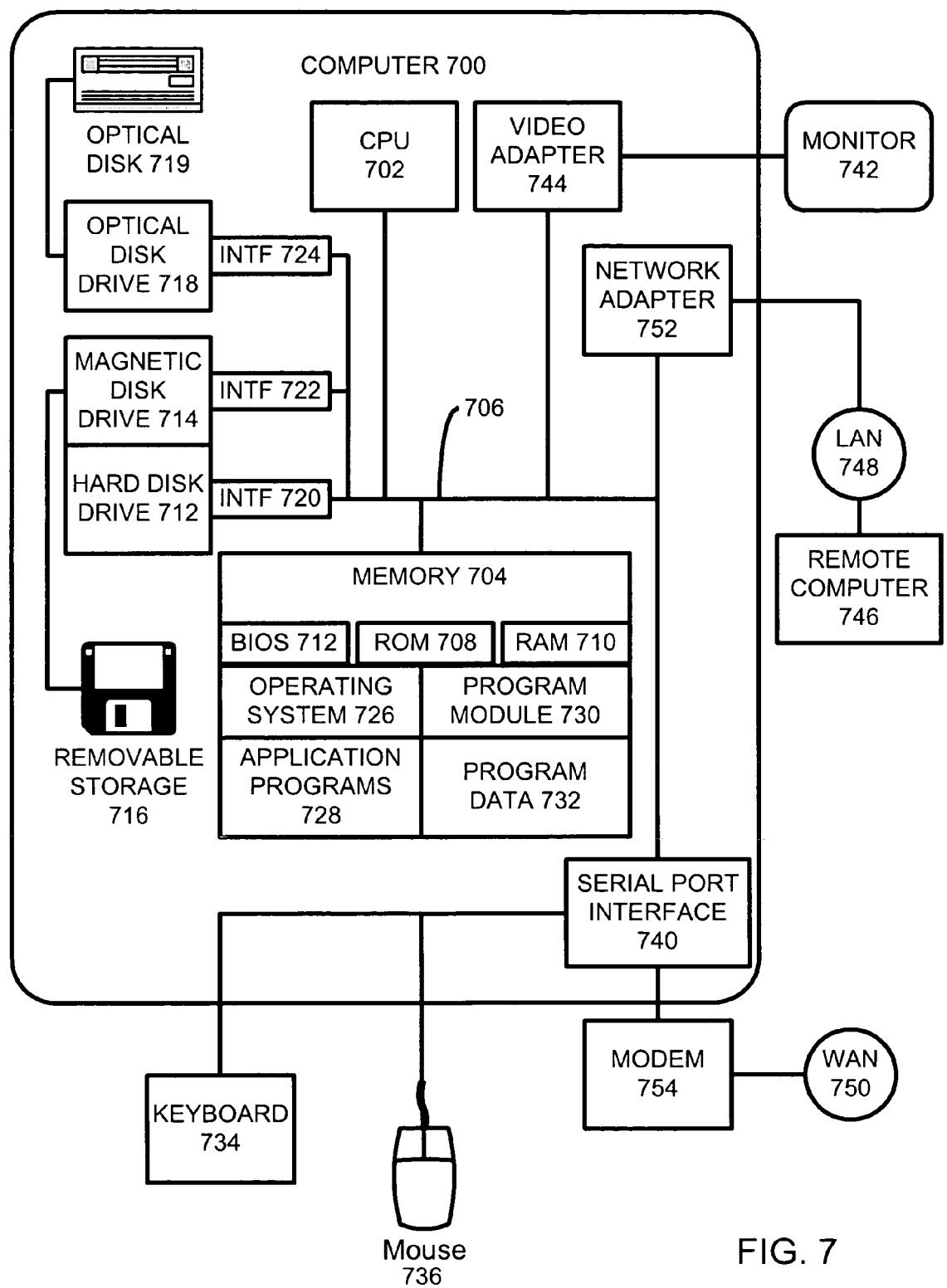
FIG. 7 illustrates an exemplary system useful for implementing an embodiment of the present invention.

FIG. 7 illustrates an exemplary system useful for implementing an embodiment of the present invention. An exemplary computing system for embodiments of the invention includes a general purpose computing device in the form of a conventional computer system 700, including a processor unit 702, a system memory 704, and a system bus 706 that couples various system components including the system memory 704 to the processor unit 700. The system bus 706 may be any of several types of bus structures including a memory bus or memory controller, a peripheral bus and a local bus using any of a variety of bus architectures. The system memory includes read only memory (ROM) 708 and random access memory (RAM) 710. A basic input/output system 712 (BIOS), which contains basic routines that help transfer information between elements within the computer system 700, is stored in ROM 708.

The computer system 700 further includes a hard disk drive 712 for reading from and writing to a hard disk, a magnetic disk drive 714 for reading from or writing to a removable magnetic disk 716, and an optical disk drive 718 for reading from or writing to a removable optical disk 719 such as a CD ROM, DVD, or other optical media. The bard disk drive 712, magnetic disk drive 714, and optical disk drive 718 are connected to the system bus 706 by a hard disk drive interface 720, a magnetic disk drive interface 722, and an optical drive interface 724, respectively. The drives and their associated computer-readable media provide nonvolatile storage of computer readable instructions, data structures, programs, and other data for the computer system 700.

Although the exemplary environment described herein employs a hard disk, a removable magnetic disk 716, and a removable optical disk 719, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 716, optical disk 719, ROM 708 or RAM 710, including an operating system 726, one or more application programs 728, other program modules 730, and program data 732. A user may enter commands and information into the computer system 700 through input devices such as a keyboard 734 and mouse 736 or other pointing device. Examples of other input devices may include a microphone, joystick, game pad, satellite dish, and scanner. These and other input devices are often connected to the processing unit 702 through a serial port interface 740 that is coupled to the system bus 706. Nevertheless, these input devices also may be connected by other interfaces, such as a parallel port, game port, or a universal serial bus (USB). A monitor 742 or other type of display device is also connected to the system bus 706 via an interface, such as a video adapter 744. In addition to the monitor 742, computer systems typically include other peripheral output devices (not shown), such as speakers and printers.

The computer system 700 may operate in a networked environment using logical connections to one or more remote computers, such as a remote computer 746. The remote computer 746 may be a computer system, a server, a router, a network PC, a peer device or other common network node, and typically includes many or all of the elements described above relative to the computer system 700. The network connections include a local area network (LAN) 748 and a wide area network (WAN) 750. Such networking environments are commonplace in offices, enterprise-wide computer networks, intranets, and the Internet.

When used in a LAN networking environment, the computer system 700 is connected to the local network 748 through a network interface or adapter 752. When used in a WAN networking environment, the computer system 700 typically includes a modem 754 or other means for establishing communications over the wide area network 750, such as the Internet. The modem 754, which may be internal or external, is connected to the system bus 706 via the serial port interface 740. In a networked environment, program modules depicted relative to the computer system 700, or portions thereof, may be stored in the remote memory storage device. It will be appreciated that the network connections shown are exemplary, and other means of establishing a communication link between the computers may be used.

In the illustrated embodiment, a security policy specification may be read from a file on the hard disk drive 712, for example, into memory 704. The CPU 702 executes memory-resident instruction code for a computer processes that implement a virtual machine and that generates a permission grant set using typed permission requests associated with a code assembly received from a resource location. Furthermore, the CPU 702 executes the software components that implement the policy manager recited in the claims.

Figure 8:
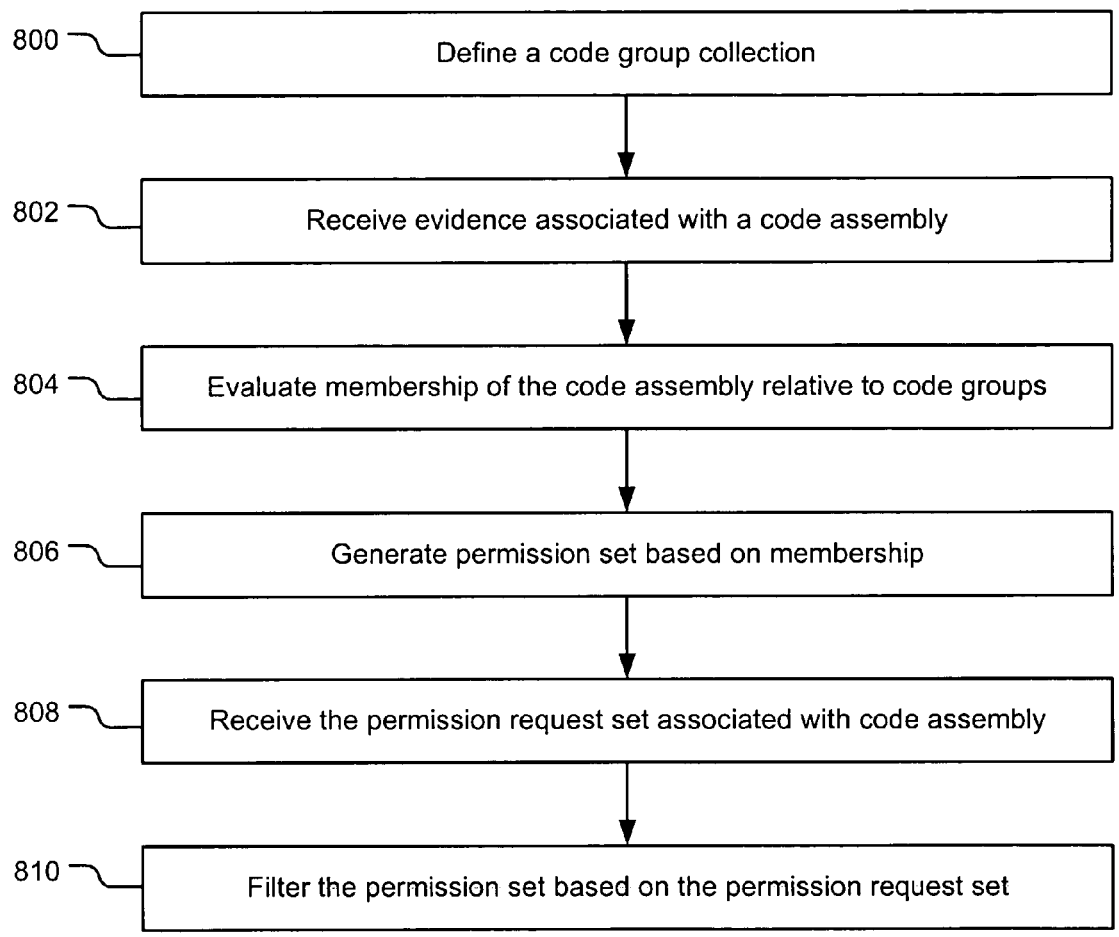
FIG. 8 illustrates a flow diagram of operations for processing a permission set in an embodiment of the present invention.

FIG. 8 illustrates a flow diagram of operations for generating a permission grant set using typed permission requests associated with a code assembly received from a resource location in an embodiment of the present invention. Defining operation 800 defines a code group collection according to a security policy specification. The code group collection includes one or more code groups and may be configured as a code group hierarchy. Receiving operation 802 receives the evidence associated with a code assembly. Membership operation 804 evaluates the membership of the code assembly relative to the code groups. Generally, the evaluation is based on a membership criterion associated with each code group.

Generating operation 806 generates a permission set based on the one or more membership determinations made by membership operation 804. For example, in one embodiment in which the code group collection is configured as a code group hierarchy, the permission set is dynamically generated by combining permissions associated with a parent code group and child code groups in which the code assembly is determined to be a member. The combined permissions are output from the generating operation 806 as the permission set, which is received by a permission/request filter module.

Receiving operation 808 receives permission requests associated with the code assembly. The permission requests may be received as a part of the code assembly, or received (or retrieved) from another source, such as a local resource location (e.g., within the computer system, from an attached peripheral or storage medium, or from a local network storage location) or a remote resource location (e.g., via the Internet).

Filtering operation 810 filters the permission set based on the permission request set to control execution of the code assembly. If the filtering operation 810 determines that a minimum request set, if provided in association with the code assembly, is not a subset of the permission set, the policy manager may prevent loading or execution of the code assembly. Likewise, if an execution permission is not included in the permission set, the filtering operation 810 may prevent loading or operation of the code assembly.

The filtering operation 810 may also omit permissions not included in a minimum request set or optional request set, if provided in association with the code assembly, when generating the permission grant set to avoid granting permissions not requested by the code assembly. Furthermore, permissions included in a refuse request set, if provided in association with the code assembly, may also be omitted from the permission grant set.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

We claim:

1. A method for processing a permission set associated with a code assembly received from a resource location to control execution of the code assembly, the method comprising:
   receiving the permission set including at least one permission associated with the code assembly;
   receiving a set of requestable permissions in association with the code assembly;
   generating a grantable permission set from a subset of the permission set specified by the set of requestable permissions prior to run-time execution of the code assembly;
   executing a first level of code assembly functionality if a first optional set of permissions specified in the requestable permission set is a subset of the permission set; and
   executing a second level of code assembly functionality if a second optional set of permission specified in the requestable permission set is a subset of the permission set.

2. The method of claim 1 wherein the generating operation comprises:
   computing a logical set operation on the permission set and the set of requestable permissions to generate the grantable permission set.

3. The method of claim 1 further comprising:
   comparing the permission set and a minimum permission condition specified by the set of requestable permissions; and
   preventing loading of the code assembly, if the permission set fails to satisfy the minimum permission condition.

4. The method of claim 1 further comprising:
   preventing execution of the code assembly, if the permission set fails to satisfy a minimum permission condition specified by the set of requestable permissions.

5. The method of claim 1 further comprising:
   defining a code group collection based on a security policy specification, the code group collection including one or more code groups;
   receiving evidence associated with the code assembly;
   evaluating membership of the code assembly in the one or more code groups, based on the evidence; and
   generating the permission set based on the membership of the code assembly in the one or more code groups.

6. The method of claim 1 wherein the set of requestable permissions specifies a plurality of typed permission request sets, each typed permission request set specifying a distinct type of permission preference requested in association with the code assembly.

7. The method of claim 1 wherein the set of requestable permissions specifies a minimum permission condition in association with the code assembly.

8. The method of claim 7 wherein the generating operation comprises:
   filtering the permission set based on the minimum permission condition to generate the grantable permission set, such that the grantable permission set includes a subset of the permission set.

9. The method of claim 7 further comprising:
   preventing loading of the code assembly, if the minimum permission condition is not a subset of the permission set.

10. The method of claim 7 further comprising:
    preventing execution of the code assembly, if the minimum permission condition is not a subset of the permission set.

11. The method of claim 1 wherein the set of requestable permissions specifies a refuse request set specifying a set of one or more permissions to be omitted from the grantable permission set associated with the code assembly.

12. The method of claim 11 further comprising:
    omitting the set of one or more permissions specified by the refuse request set from the set of grantable permissions.

13. The method of claim 1 wherein the set of requestable permissions includes an optional request set specifying an optional set of permissions requestable in association with the code assembly and a minimum request set specifying a minimum set of permissions requestable in association with the code assembly, and wherein the generating operation comprises:
    computing a union of the optional request set and the minimum request set to provide a maximum request set; and
    computing an intersection of the maximum request set and the permission set.

14. The method of claim 13 wherein the set of requestable permissions further specifies a refuse request set specifying a set of one or more permissions to be omitted from the grantable permission set in associated with the code assembly, and wherein the generating operation further comprises:
    subtracting the set of one or more permissions specified in the refuse request set from the intersection of the maximum request set and the permission set.

15. The method of claim 1 wherein the operation of receiving the set of requestable permissions comprises:
    receiving the set of requestable permissions and the code assembly in a single network communication.

16. The method of claim 1 wherein the operation of receiving the set of requestable permissions comprises:
    retrieving the set of requestable permissions in a network communication distinct from a network communication in which the code assembly is received.

17. A computer program storage medium readable by a computer system and encoding a computer program for executing a computer process processing a permission set associated with a code assembly received from a resource location, the computer process comprising:
    receiving the permission set including at least one permission associated with the code assembly;
    receiving a set of requestable permissions in association with the code assembly;
    filtering the permission set based on the set of requestable permissions prior to run-time execution of the code assembly;
    executing a first level of code assembly functionality if a first optional set of permissions specified in the requestable permission set is a subset of the permission set; and
    executing a second level of code assembly functionality if a second optional set of permission specified in the requestable permission set is a subset of the permission set.

18. A computer program product encoding a computer program for executing on a computer system a computer process processing a permission set associated with a code assembly received from a resource location to control execution of the code assembly, the computer process comprising:
    defining a code group collection based on a security policy specification, the code group collection including one or more code groups;
    receiving evidence associated with the code assembly;
    evaluating membership of the code assembly in the one or more code groups, based on the evidence;
    generating the permission set based on the membership of the code assembly in the one or more code groups;
    receiving a set of requestable permissions in association with the code assembly;
    computing a logical set operation on the permission set and the set of requestable permissions to generate a grantable permission set before execution of the code assembly;
    executing a basic functionality of the code assembly if an optional set of permissions specified in the set of requestable permissions is not a subset of the permission set; and
    executing an enhanced functionality of the code assembly if the optional set of permissions specified in the set of requestable permissions is a subset of the permission set.

19. The computer program product of claim 18 wherein the set of requestable permissions includes an optional request set specifying an optional set of permissions requestable in association with the code assembly and a minimum request set specifying a minimum set of permissions requestable in association with the code assembly, and wherein the computing operation comprises:
    computing a union of the optional request set and the minimum request set to provide a maximum request set; and
    computing an intersection of the maximum request set and the permission set.

20. The computer program of claim 19 wherein the set of requestable permissions further specifies a refuse request set specifying a set of one or more permissions to be omitted from the grantable permission set in associated with the code assembly, and wherein the computing operation further comprises:
    subtracting the set of one or more permissions specified in the refuse request set from the intersection of the maximum request set and the permission set.

21. The method of claim 1, wherein the set of requestable permissions comprise characteristics of the permissions needed by the code assembly.

22. The method of claim 1, further comprising controlling execution of the code assembly based upon the grantable permission set.

23. The method of claim 22, wherein controlling execution of the code assembly comprises:
    receiving a permission request associated with the code assembly; and
    selectively granting the requested permission as a function of the grantable permission set during run-time execution of the code assembly.

* * * * *

UNITED STATES PATENT AND TRADEMARK OFFICE
CERTIFICATE OF CORRECTION

PATENT NO. : 6,981,281 B1 Page 1 of 1
APPLICATION NO. : 09/599015
DATED : December 27, 2005
INVENTOR(S) : Brian A. LaMacchia et al.

It is certified that error appears in the above-identified patent and that said Letters Patent is hereby corrected as shown below:

Title Page;
On the face page, in field (56), under "Other Publications", in column 1, line 2, delete "Inc," and insert -- Inc., --, therefor.

On page 2, in field (56), under "Other Publications", in column 1, line 8, delete "Blaze." and insert -- Blaze, --, therefor.

On page 2, in field (56), under "Other Publications", in column 1, line 9, delete "Keromytis," and insert -- Keromytis. --, therefor.

On page 2, in field (56), under "Other Publications", in column 1, line 10, delete "Lecutre" and insert -- Lecture --, therefor.

In column 6, line 16, delete "superceding" and insert -- superseding --, therefor.

In column 12, line 38, delete "Skip Verification" and insert -- SkipVerification --, therefor.

In column 16, line 18, delete "bard" and insert -- hard --, therefor.

In column 16, line 24, delete "computer readable" and insert -- computer-readable --, therefor.

In column 17, line 17, delete "processes" and insert -- process --, therefor.

Signed and Sealed this

Eighth Day of September, 2009

David J. Kappos
*Director of the United States Patent and Trademark Office*